US008763695B2

(12) United States Patent
van Zanten

(10) Patent No.: US 8,763,695 B2
(45) Date of Patent: Jul. 1, 2014

(54) ELECTRICALLY CONDUCTIVE OIL-BASED DRILLING FLUIDS

(75) Inventor: Ryan van Zanten, Spring, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 855 days.

(21) Appl. No.: 12/761,233

(22) Filed: Apr. 15, 2010

(65) Prior Publication Data

US 2011/0254553 A1    Oct. 20, 2011

(51) Int. Cl.
| | | |
|---|---|---|
| *C09K 8/32* | (2006.01) | |
| *G01V 3/20* | (2006.01) | |
| *C09K 8/36* | (2006.01) | |
| *C09K 8/40* | (2006.01) | |
| *C09K 8/64* | (2006.01) | |
| *C09K 8/82* | (2006.01) | |

(52) U.S. Cl.
CPC ... *C09K 8/32* (2013.01); *G01V 3/20* (2013.01); *C09K 8/36* (2013.01); *C09K 8/40* (2013.01); *C09K 8/64* (2013.01); *C09K 8/82* (2013.01)
USPC ............ 166/254.2; 166/250.1; 166/252.6

(58) Field of Classification Search
USPC ............................. 166/254.2, 250.1, 252.6
See application file for complete search history.

(56) References Cited

U.S. PATENT DOCUMENTS

| | | | |
|---|---|---|---|
| 2,717,239 A | | 9/1955 | Fischer et al. |
| 2,739,120 A | | 3/1956 | Fischer |
| 3,111,491 A | | 11/1963 | Atkins, Jr. et al. |
| 4,689,161 A | * | 8/1987 | Blumenthal et al. .......... 508/121 |
| 6,006,831 A | * | 12/1999 | Schlemmer et al. ..... 166/250.01 |
| 6,029,755 A | | 2/2000 | Patel et al. |
| 6,308,788 B1 | | 10/2001 | Patel et al. |
| 6,405,809 B2 | | 6/2002 | Patel et al. |
| 6,525,003 B2 | | 2/2003 | Schlemmer et al. |
| 6,691,805 B2 | | 2/2004 | Thaemlitz |
| 6,770,603 B1 | | 8/2004 | Sawdon et al. |
| 6,787,505 B1 | | 9/2004 | Maitland et al. |
| 6,809,521 B2 | | 10/2004 | Tabarovsky et al. |
| 6,887,832 B2 | | 5/2005 | Kirsner et al. |
| 7,112,557 B2 | | 9/2006 | Thaemlitz |
| 7,278,485 B2 | | 10/2007 | Kirsner et al. |
| 7,299,131 B2 | | 11/2007 | Tabarovsky et al. |
| 7,399,731 B2 | | 7/2008 | Jones et al. |
| 7,424,911 B2 | * | 9/2008 | McCarthy et al. ....... 166/250.12 |
| 7,456,135 B2 | | 11/2008 | Kirsner et al. |
| 7,462,580 B2 | | 12/2008 | Kirsner et al. |
| 7,485,602 B2 | | 2/2009 | Kirsner et al. |
| 7,488,704 B2 | | 2/2009 | Kirsner et al. |
| 7,534,743 B2 | | 5/2009 | Kirsner et al. |
| 7,547,663 B2 | | 6/2009 | Kirsner et al. |
| 7,645,723 B2 | | 1/2010 | Kirsner et al. |
| 7,696,131 B2 | | 4/2010 | Oyler et al. |
| 2006/0046937 A1 | * | 3/2006 | Fu et al. ........................ 507/131 |
| 2007/0066491 A1 | * | 3/2007 | Bicerano et al. .............. 507/117 |
| 2008/0171674 A1 | * | 7/2008 | Lewis et al. ................... 507/240 |
| 2008/0315884 A1 | | 12/2008 | Bittar et al. |
| 2009/0032259 A1 | | 2/2009 | DiFoggio et al. |

FOREIGN PATENT DOCUMENTS

| | | |
|---|---|---|
| WO | 2007013883 A2 | 2/2007 |
| WO | 2009030868 A2 | 3/2009 |
| WO | 2009035436 A1 | 3/2009 |

OTHER PUBLICATIONS

Amanullah, MD., et al., "Nano-technology—its significance in smart fluid development for oil and gas field application," SPE 126102, 2009, pp. 1-12, Society of Petroleum Engineers.
Baroid Fluid Services brochure entitled "INNOVERT® high performance," Dec. 2007, 2 pages, Halliburton.
Colbert, Daniel T., "Single-wall nanotubes: a new option for conductive plastics and engineering polymers," Plastics Additives & Compounding, Jan./Feb. 2003, pp. 18-25, Elsevier Science Ltd.
Dekker, Cees, "Carbon nanotubes as molecular quantum wires," Physics Today, May 1999, pp. 22-28, American Institute of Physics.
Laastad, H., et al., "Water-based formation imaging and resistivity logging in oil-based drilling fluids—today's reality," SPE 62977, 2000, pp. 1-16, Society of Petroleum Engineers, Inc.
Salazar, Jesús M., et al., "Fluid density and viscosity effects on borehole resistivity measurements acquired in the presence of oil-based mud and emulsified surfactants," SPE 109946, 2007, pp. 1-16, Society of Petroleum Engineers.
Shelley, Suzanne, "Carbon nanotubes: a small-scale wonder," www.che.com, Jan. 2003, pp. 27-29, Chemical Engineering.
Foreign communication from a related counterpart application—International Search Report and Written Opinion, PCT/GB2011/000485, May 20, 2011, 10 pages.
Durham, Louise S., "Image gets to the core of the issue," Dec. 10, 2008, 3 pages, AAPG Explorer.
Halliburton brochure entitled "Oil mud reservoir imager (OMRI™) tool superior borehole images in oil-based muds," Jun. 2008, 2 pages, Halliburton.
Schlumberger brochure entitled "OBMI: borehole imaging in oil-base mud," Jul. 2006, 7 pages, Schlumberger.

* cited by examiner

*Primary Examiner* — Kristina Fulton
*Assistant Examiner* — Silvana Runyan
(74) *Attorney, Agent, or Firm* — Craig Roddy; Conley Rose, P.C.

(57) ABSTRACT

A method of servicing a wellbore comprising placing an oil-based wellbore servicing fluid comprising an electrical conductivity enhancer into the wellbore and logging the wellbore by resistivity imaging. A method of servicing a wellbore comprising introducing an oil-based drilling fluid to a wellbore, identifying a subsection of the wellbore for imaging, introducing to the subsection of the wellbore a oil-based wellbore servicing fluid comprising a carbon nanotube wherein the servicing fluid comprising the electrical conductivity enhancer mixes with the oil-based drilling fluid; and imaging the subsection of the wellbore.

22 Claims, No Drawings

ELECTRICALLY CONDUCTIVE OIL-BASED DRILLING FLUIDS

FIELD

This disclosure relates to servicing a wellbore. More specifically, it relates to servicing a wellbore with wellbore servicing fluids comprising an electrical conductivity enhancer and methods of making and using same.

BACKGROUND

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

The aforementioned process initiates with evaluation of the subterranean formation from which the natural resource is to be recovered. The evaluation may begin with retrieval of samples of the formation and reservoir for laboratory analysis. In particular, for a wellbore, the method may initiate with the gathering of information to produce a well log. Well logging is a technique for providing information to a formation evaluation professional or driller regarding the particular earth formation being drilled. Such information typically includes the characteristics of the earth formations traversed by the wellbore, and the location of subsurface reservoirs of the natural resource. A common method employed in well logging involves imaging of the wellbore using techniques such as acoustic imaging, azimuthal density neutron imaging, and resistivity imaging. Of the three, resistivity imaging is particularly advantageous in terms of the relative simplicity of operation, rapid acquisition of real-time data, and highly accurate images of geological features.

Resistivity imaging techniques are based on measurements of the electrical resistance of the formation exposed to the wellbore. Tools based on this technique typically apply an alternating current of approximately one volt at an operating frequency of about 15 kHz. The current is applied to the formation through a series of pads that are pressed firmly against the wellbore. After passing into the formation, the signal is conducted back to a detector on the tool by a wellbore fluid. The electrical conductivity of the wellbore fluid directly affects the quality of the resolved image. If the wellbore fluid is overly conductive a poorer image may result due to an electrical short preventing good electrical penetration into the formation. If the fluid behaves as a dielectric or a capacitor, the lack of a signal or an unfavorable signal-to-noise ratio may prevent satisfactory image resolution. Such dielectric behavior is often exhibited by wellbore servicing fluids comprising traditional oil-based muds (OBM). The continuous hydrocarbon phase of an OBM is an electrical insulator, causing the mud to behave in a dielectric manner and limiting the utility of these wellbore fluids in resistivity imaging. For example, resistivity measurements in oil based drilling fluids often employ special tools which are not easily accessible to all operators or regions. Therefore, there is continuing need and interest in developing oil-based wellbore servicing fluids with improved conductivity and with expanded ability to be used in resistivity imaging applications.

SUMMARY

Disclosed herein is a method of servicing a wellbore comprising placing an oil-based wellbore servicing fluid comprising an electrical conductivity enhancer into the wellbore and logging the wellbore by resistivity imaging.

Also disclosed herein is a method of servicing a wellbore comprising introducing an oil-based drilling fluid to a wellbore, identifying a subsection of the wellbore for imaging, introducing to the subsection of the wellbore an oil-based wellbore servicing fluid comprising a carbon nanotube wherein the servicing fluid comprising the carbon nanotube mixes with the oil-based drilling fluid; and imaging the subsection of the wellbore.

Further disclosed herein is an oil-based wellbore servicing fluid comprising an electrical conductivity enhancer, wherein the oil-based wellbore servicing fluid comprises hydrocarbons, olefins, an internal olefin based oil, mineral oil, kerosene, diesel oil, fuel oil, synthetic oil, a linear or branched paraffin, an ester, an acetal, mixtures of crude oil, derivatives thereof, or combinations thereof, and wherein the electrical conductivity enhancer comprises fullerenes, carbon nanotubes, $C_{60}$ carbon molecules, icosahedral $C_{60}$ carbon molecules, $C_{72}$, $C_{84}$, $C_{96}$, $C_{108}$, or $C_{120}$ single-walled carbon nanotubes, multi-walled carbon nanotubes, or combinations thereof.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are oil-based wellbore servicing fluids (OB-WSF) comprising electrical conductivity enhancers and optionally one or more additional components, which may be referred to herein as an OBEE. In an embodiment, the OB-WSF comprising the electrical conductivity enhancer exhibits a rheological profile substantially similar to that of a same or substantially similar OB-WSF lacking the electrical conductivity enhancer. Such OBEEs and methods of making and using same are described herein in detail. Also disclosed herein is a method of logging a wellbore comprising placing an OB-WSF comprising an electrical conductivity enhancer into the wellbore and performing resistivity imaging.

In this disclosure, electrical conductivity (or specific conductance) is a measure of a material's ability to conduct an electric current. When an electrical potential difference is placed across a conductor, its movable charges flow, giving rise to an electric current. Conductivity is defined as the ratio of the current density to the electric field strength. Conductivity is the reciprocal (inverse) of electrical resistivity. Electrical conductivity enhancers are compounds that increase the electrical conductivity of the wellbore servicing fluid in which they are placed. Accordingly, an OB-WSF comprising an electrical conductivity enhancer may be characterized by a decreased electrical resistance when compared to an otherwise similar OB-WSF lacking the electrical conductivity enhancer. In this disclosure, electrical resistivity (also known as specific electrical resistance or volume resistivity) is a measure of how strongly a material opposes the flow of electric current. A low resistivity indicates a material that readily allows the movement of electrical charge.

As used herein, a "wellbore servicing fluid" (WSF) or "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are well known in the art.

In an embodiment, an OB-WSF refers to a wellbore servicing fluid wherein the liquid components thereof comprise less than 50, 45, 40, 35, 30, 25, 20, 25, 10, 9, 8, 7, 6, 5, 4, 3, 2, or 1 weight percent water, with the balance of the liquid components being organic liquid components (e.g., oil or oleaginous fluids). In an embodiment, the organic liquid components comprise oil or oil based compounds, as those terms are understood to those of skill in the art. In an embodiment, oil in the general sense refers to a wide variety of non-aqueous fluids of the type disclosed herein and that are immiscible with water, e.g, hydrocarbons, fats, esters, etc. In an embodiment, the organic liquid components comprise one or more oleaginous fluids. An oleaginous fluid herein refers to a non-aqueous composition which comprises hydrocarbons, olefins, internal olefin based oils, mineral oil, kerosene, diesel oil, fuel oil, synthetic oil, linear or branched paraffin, esters, acetals, mixtures of crude oil, derivatives thereof, or combinations thereof.

In an embodiment, the OB-WSF comprises drilling fluid, also referred to as drilling mud or mud, for example an oil based drilling fluid. Alternatively, the OB-WSF fluid consists or consists essentially of a drilling fluid or mud, for example an oil-based drilling fluid. In an embodiment, the OB-WSF comprises an invert emulsion, for example an invert emulsion drilling fluid (e.g., an oleaginous fluid based, invert emulsion drilling fluid). Alternatively, the OB-WSF fluid consists or consists essentially of an invert emulsion, for example an invert emulsion drilling fluid.

Herein an emulsion refers to a mixture of two or more immiscible liquids where one liquid (the dispersed phase or the internal phase) is dispersed in the other (the continuous phase or the external phase). There are two major categories of emulsions—oil in water (OIW) emulsions and water in oil (WIO) emulsions (also referred to as invert emulsions). In this disclosure, "emulsion" is used as a shorthand form of "invert emulsion" (or WIO emulsion) when used with respect to wellbore service unless otherwise specified. In an embodiment, the OB-WSF is an oil-based mud, or a WIO emulsion mud.

In an embodiment, the OBEE comprises a OB-WSF in an amount of from about 0.1 wt. % to about 10 wt. %, alternatively from about 0.2 wt. % to about 8 wt. %, alternatively from about 0.5 wt. % to about 3 wt. % based upon the total weight of the OBEE.

In an embodiment, the OBEE comprises water, for example as a component of the OB-WSF or as a separate component added to the overall composition. The water may comprise fresh water, salt water (e.g., water containing one or more salts dissolved therein), brine (e.g., saturated salt water produced from subterranean formations), or seawater.

In some embodiments, additives may be included in the OBEE (or a component thereof such as the OB-WSF) for improving or changing the properties thereof. Examples of such additives include but are not limited to salts, accelerants, set retarders or inhibitors, defoamers, fluid loss agents, weighting materials, dispersants, vitrified shale, formation conditioning agents, carbon fibers, glass fibers, metal fibers, minerals fibers, clay, colloidal polymers, stabilizers, degreasers, lubricants, viscosifiers, wetting agents, suspending agents, weighting agents such as barite, fillers, packing agents, fluid absorbing materials, resins, aqueous superabsorbers, viscosifying agents, suspending agents, dispersing agents, or combinations thereof. These additives may be included singularly or in combination. Methods for introducing these additives and their effective amounts are known to one of ordinary skill in the art.

In an embodiment, the OBEE comprises an electrical conductivity enhancer. Any material compatible with the other components of the OBEE and able to provide the herein disclosed properties may be employed as an electrical conductivity enhancer. For example, the electrical conductivity enhancer may comprise a fullerene, alternatively a carbon nanotube.

As used herein, a fullerene is any carbonaceous material wherein the structure is a regular, three dimensional network of fused carbon rings arranged in any one of a number of possible structures including, but not limited to, cylindrical, spherical, ovoid, oblate or oblong. Nonlimiting examples of electrical conductivity enhancers suitable for use in this disclosure include cylindrical carbon nanotube, $C_{60}$ carbon molecules, icosahedral $C_{60}$ carbon molecules, $C_{72}$, $C_{84}$, $C_{96}$, $C_{108}$, $C_{120}$, single-walled carbon nanotubes (SWNT), multi-walled carbon nanotubes (MWNT), or combinations thereof. Single-walled carbon nanotubes differ from multi-walled carbon nanotubes based on the number of concentric tubes present; single-walled carbon nanotubes comprise only one tube about a given center whereas multi-walled carbon nanotubes have at least two, and often more, nested tubes about a common center. All carbon nanotubes tend to agglomerate into ropes and bundles of many carbon nanotubes and it is ordinarily quite difficult to obtain individual, dispersed carbon nanotubes. In an embodiment, the electrical conductivity enhancer comprises a carbon nanotube. Hereinafter the disclosure will refer to the use of carbon nanotubes (CNTs) as the electrical conductivity enhancer although other electrical conductivity enhancers of the type described herein are also contemplated.

In an embodiment, CNTs suitable for use in this disclosure have a length of from about 1 μm to about 100 mm, alternatively from about 10 μm to about 10 mm, alternatively from about 100 μm to about 1 mm and an aspect ratio of from about 100,000,000 to about 1, alternatively from about 1,000,000 to about 1, alternatively from about 1,000 to about 1.

In an embodiment, the OBEE comprises a functionalized CNT. The CNT may be functionalized so as to provide and/or improve some user and/or process desired characteristic. For example, the CNT may be functionalized so as increase the hydrophilicity of the particles. In an embodiment, the CNTs are oxidized such as by the introduction of hydroxyl groups onto the surface of the nanotube. In an embodiment, CNTs functionalized by the introduction of hydroxyl groups onto at least a portion of the surface may have a density of hydroxyl groups of from about 0.0001% to about 10%, alternatively from about 0.001% to about 1%, alternatively from about 0.01% to about 0.1% based on the mol % of carboxyl groups to carbon atoms. Functionalized CNTs of the type described herein and suitable for use are widely commercially available or may be prepared using any suitable methodology.

In an embodiment, the electrical conductivity enhancer (e.g., CNTs and/or functionalized CNTs) may be present in the OBEE in an amount in the range of from about 0.1 pounds per barrel (lbs/bbl) to about 10 lbs/bbl, alternatively from about 0.5 lbs/bbl to about 5 lbs/bbl, alternatively from about 0.5 lbs/bbl to about 1.0 lbs/bbl.

In an embodiment, an OBEE of the type described herein has an electrical resistivity that is decreased in comparison to an otherwise similar composition lacking electrical conductivity enhancers such as CNTs. For example an OBEE of the type described herein may have an electrical resistivity of from about 0.01 Ohm*m to about 20 Ohm*m, alternatively from about 0.1 Ohm*m to about 10 Ohm*m, alternatively from about 1 Ohm*m to about 5 Ohm*m.

In an embodiment, an OBEE of the type described herein has an electrical stability that is increased in comparison to an otherwise similar composition lacking CNTs. In this disclosure, electrical stability (ES) is obtained for oil-based or synthetic-based muds by an electrical stability test. Such a test is performed using an ES meter by inserting an ES probe into a cup of 120° F. [48.9° C.] mud. The ES meter automatically applies an increasing voltage (from 0 to 2000 volts) across an electrode gap in the probe. The maximum voltage that the mud will sustain across the gap before conducting current is displayed as the ES voltage. In an embodiment, the OBEE has an electrical stability (i.e., an ES voltage) of from about 1 volt (V) to about 200 V, alternatively from about 10 V to about 100 V, alternatively from about 20 V to about 50 V.

In an embodiment, an OBEE displays a rheology that is substantially similar to an otherwise identical composition lacking electrical conductivity enhancers such as CNTs. For example the OBEE may have a yield point (YP) in the range of from about 1 lbs/1000 ft$^2$ to about 50 lbs/1000 ft$^2$, alternatively from about 5 lbs/1000 ft$^2$ to about 40 lbs/1000 ft$^2$, alternatively from about 10 lbs/1000 ft$^2$ to about 30 lbs/1000 ft$^2$ and a plastic viscosity in the range of from about 1 centipoise (cP) to about 100 cP, alternatively from about 5 cP to about 50 cP, alternatively from about 10 cP to about 30 cP. The plastic viscosity is an absolute flow property indicating the flow resistance of certain types of fluids and is a measure of shearing stress while the yield point refers to the resistance of the drilling fluid to initial flow, or represents the stress required to start fluid movement.

In an embodiment, a method of servicing a wellbore comprises well logging wherein an OBEE of the type described herein is placed in a wellbore. The logging procedure consists of lowering a 'logging tool' on the end of a wireline into an oil well (or hole) to measure the rock and fluid properties of the formation. An interpretation of these measurements is then made to locate and quantify potential depth zones containing oil and gas (hydrocarbons). In an embodiment well logging is carried out utilizing resistivity imaging. An OBEE of the type described herein may facilitate the well logging process by providing a decreased electrical resistance (or increased electrical conductivity) when compared to an otherwise similar composition lacking an electrical conductivity enhancer. For example, the OBEE may have a resistance of less than about 20 Ohm*m, alternatively less than about 15 Ohm*m, alternatively less than about 10 Ohm*m. Additional description on well logging can be found in U.S. Pat. No. 7,269,514 which is incorporated by reference herein.

In an embodiment, a method of servicing a wellbore comprises spotting an OBEE of the type described herein into a wellbore, and imaging the wellbore with a well logging tool. In an embodiment a method of servicing a wellbore comprises introducing a pill comprising an OBEE of the type described herein wherein the OBEE has CNTs present in an amount of from about less than about 2 lbs/bbl, alternatively less than about 1 lbs/bbl, alternatively less than about 0.5 ppb. The pill may be spotted down the wellbore to the section that is to be logged. In this disclosure, spotting is a process wherein a small volume or pill of fluid (e.g., smaller than the total volume of fluid in the wellbore) is placed in a subterranean formation, a wellbore, and/or wellbore annulus. It is often desirable for a wellbore servicing operation involving localized treatment to accurately place treatment fluids such as cement slurries and stimulation fluids. Thus, wellbore spotting is practiced when it is desirable to accurately place a fluid, or fluid interface, at a given position within the wellbore, and prior to, concurrent with, and/or subsequent to placement of the spotting fluid, a wellbore logging tool may be used (e.g., tripped into/out of the wellbore) to log a portion thereof (e.g., the portion adjacent to the spotted fluid). Thus, OBEEs of the type described herein may facilitate well logging such that the user may accurately place the appropriate volume of wellbore servicing fluid (e.g., the spotting fluid (e.g., OBEE) itself and/or a treatment fluid subsequent to improved/enhanced logging obtained via placement of the OBEE in the wellbore) while taking account of various factors such as well production, wellbore returns and fluid-density variations.

In an embodiment, the OBEEs comprise an emulsion of the type described herein. Such OBEEs may display the aforementioned electrical stability, electrical resistivity, and electrical conductivity while maintaining a stable emulsion. Herein a stable emulsion refers to the ability of the composition to maintain a single phase while exhibiting the described electrical properties.

An OBEE of the type described herein may display increased electrical conductivity when compared to an otherwise similar composition lacking electrical conductivity enhancers such as CNTs. Such OBEEs may allow for improved well logging using resistivity imaging. In an embodiment the OBEE comprises a WIO emulsion and an electrical conductivity enhancer of the type described herein. An OBEE of the type described herein maintains a stable emulsion in the presence of the electrical conductivity enhancer such that the emulsion maintains a single phase. Further, the OBEEs have a rheological profile substantially similar to that of an otherwise similar composition lacking electrical conductivity enhancers such as CNTs. Previously due to the limited ability to utilize oil-based drilling fluids, a method of well logging involved introducing a water based fluid to the wellbore in order to facilitate resistivity imaging of the subterranean formation. The water-based fluid would have to be displaced after well logging if an oil-based fluid was to be utilized as the "bulk" fluid in subsequent wellbore servicing operations. OBEEs of the type described herein advantageously allow the compositions to be mixed with the bulk fluid, thereby eliminating the need for the additional complexities associated with displacement of a water-based bulk fluid and simplifying the well logging process.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

An OBEE of the type described herein was prepared and its properties investigated. Specifically, functionalized carbon nanotubes were added to an INNOVERT drilling fluid in an amount of 0.25 ppb (pounds per barrel) and designated Sample A. INNOVERT is a mineral-oil based invert emulsion drilling fluid commercially available from Halliburton Energy Services. The carbon nanotubes were functionalized by oxidation with nitric oxide. A comparative sample having INNOVERT drilling fluid and no carbon nanotubes was prepared and designated Sample B. At room temperature, the rheological properties of the fluid were measured using a FANN 35 viscometer at 3, 6, 100, 200, 300, and 600 RPM. The viscosity at each mixing speed, plastic viscosity (centipoise) and yield point (lbs/100 ft$^2$) of the resultant slurries was measured in accordance with API Recommended Practices 10B, Bingham Plastic Model and are given in Table 1.

TABLE 1

| Reading | Sample A | Sample B (comparative) |
|---|---|---|
| 600 rpm | 66 | 70 |
| 300 rpm | 39 | 43 |
| 200 rpm | 29 | 32 |
| 100 rpm | 19 | 22 |
| 6 rpm | 7 | 8 |
| 3 rpm | 6 | 7 |
| PV (lb/ft$^2$) | 27 | 27 |
| YP (lb/ft$^2$) | 12 | 16 |
| 10 sec (lb/ft$^2$) | 8 | 9 |
| 10 min (lb/ft$^2$) | 17 | 18 |
| HPHT filtrate at 300° F. | 1.8 | 3 |
| Electrical Stability (V) | >900 | <75 |

HPHT = high pressure high temperature

Additionally the permeability of the filtercake at 300° F. was measured under HPHT conditions along with the gel structure stability at 10 secs and 10 mins. These results are also presented in Table 1. From Table 1, it can be seen that addition of CNTs greatly reduced the electrical stability (ES) of the drilling fluid (i.e., Sample A), which corresponds with reduced electrical resistivity, without substantially changing the rheological properties of the drilling fluid. Normally a reduction in ES indicates an emulsion failure, which usually results in a major change in fluid rheology and readily apparent top oil separation. The rheology of the fluid with added CNTs (i.e., Sample A) remained relatively stable, no accelerated top oil separation was seen (i.e. emulsion remained as a single phase) and the ES dropped by an order of magnitude.

The results demonstrate that using functionalized nanotubes fluid viscosity was slightly increased, showing an additional benefit by CNT addition. The CNTs may also strengthen the filter cake, similar to carbon fiber additions to various materials, but no obvious added benefit was seen in the HPHT results.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising:
   placing an oil-based wellbore servicing fluid comprising an electrical conductivity enhancer into the wellbore wherein the oil is present in the wellbore servicing fluid in an amount of equal to or greater than about 50 wt. % based on the total weight of the wellbore servicing fluid; and
   logging the wellbore by resistivity imaging wherein the oil-based wellbore servicing fluid is formulated as a drilling fluid.

2. The method of claim 1 wherein the oil-based wellbore servicing fluid comprises hydrocarbons, olefins, internal olefin based oil, mineral oil, kerosene, diesel oil, fuel oil, synthetic oil, linear or branched paraffin, ester, acetal, mixtures of crude oil, derivatives thereof, or combinations thereof.

3. The method of claim 1 wherein the oil-based wellbore servicing fluid comprises a water-in-oil emulsion.

4. The method of claim 1 wherein the oil-based wellbore servicing fluid further comprises water in an amount of equal to or less than about 50 wt. % based on total weight of the wellbore servicing fluid.

5. The method of claim 1 wherein the electrical conductivity enhancer is present in an amount of from about 0.1 lbs/bbl to about 10 lbs/bbl.

6. The method of claim 1 wherein the electrical conductivity enhancer comprises fullerenes, carbon nanotubes, $C_{60}$ carbon molecules, icosahedral $C_{60}$ carbon molecules, $C_{72}$, $C_{84}$, $C_{96}$, $C_{108}$, or $C_{120}$ single-walled carbon nanotubes, multi-walled carbon nanotubes, or combinations thereof.

7. The method of claim 1 wherein the oil-based wellbore servicing fluid has an electrical resistivity of from about 0.01 Ohm*m to about 20 Ohm*m.

8. The method of claim 1 wherein the oil-based wellbore servicing fluid has an electrical stability of from about 1 V to about 200 V.

9. The method of claim 1 wherein the oil-based wellbore servicing fluid has a yield point of from about 1 lbs/1000 ft$^2$ to about 50 lbs/1000 ft$^2$.

10. The method of claim 1 wherein the oil-based wellbore servicing fluid has a plastic viscosity of from about 1 cP to about 100 cP.

11. The method of claim 1 wherein well logging is improved when compared to an otherwise similar process lacking an electrical conductivity enhancer.

12. The method of claim 1 wherein the oil-based wellbore servicing fluid comprises an emulsion.

13. The method of claim 1 wherein the electrical conductivity enhancer comprises carbon nanotubes.

14. The method of claim 13 wherein the carbon nanotubes have a length of from about 10 μm to about 10 mm.

15. The method of claim 13 wherein the carbon nanotubes have an aspect ratio of from about 100,000,000 to about 1.

16. The method of claim 13 wherein the carbon nanotubes comprise hydroxyl groups.

17. A method of servicing a wellbore comprising;
introducing an oil-based drilling fluid to a wellbore;
identifying a subsection of the wellbore for imaging;
introducing to the subsection of the wellbore an oil-based wellbore servicing fluid comprising a carbon nanotube, wherein oil is present in the oil-based wellbore servicing fluid in an amount of equal to or greater than about 50 wt. % based on the total weight of the oil-based wellbore servicing fluid and wherein the oil-based wellbore servicing fluid mixes with the oil-based drilling fluid; and
imaging the subsection of the wellbore.

18. The method of claim 17 wherein the carbon nanotube has been functionalized by contacting with an oxidizing agent.

19. An oil-based drilling fluid comprising an electrical conductivity enhancer, wherein the oil-based drilling fluid comprises hydrocarbons, olefins, an internal olefin based oil, mineral oil, kerosene, diesel oil, fuel oil, synthetic oil, a linear or branched paraffin, an ester, an acetal, mixtures of crude oil, derivatives thereof, or combinations thereof in an amount of equal to or greater than about 50 wt. % based on the total weight of the oil-based drilling fluid; and wherein the electrical conductivity enhancer comprises fullerenes, carbon nanotubes, $C_{60}$ carbon molecules, icosahedral $C_{60}$ carbon molecules, $C_{72}$, $C_{84}$, $C_{96}$, $C_{108}$, or $C_{120}$ single-walled carbon nanotubes, multi-walled carbon nanotubes, or combinations thereof.

20. The drilling fluid of claim 19, wherein the fluid comprises an emulsion and the electrical conductivity enhancer comprises a functionalized carbon nanotube.

21. The drilling fluid of claim 19 having an electrical resistivity of from about 0.01 Ohm*m to about 20 Ohm*m.

22. The drilling fluid of claim 19 having an electrical stability of from about 1 V to about 200 V.

* * * * *